Patented Oct. 30, 1923.

1,472,324

UNITED STATES PATENT OFFICE.

RAY M. CARTER, OF BALTIMORE, MARYLAND, ASSIGNOR TO U. S. INDUSTRIAL ALCOHOL CO., A CORPORATION OF WEST VIRGINIA.

PROCESS FOR MAKING ESTER CONDENSATION PRODUCTS.

REISSUED

No Drawing. Application filed April 5, 1921. Serial No. 458,851.

*To all whom it may concern:*

Be it known that I, RAY M. CARTER, a citizen of the United States, residing at Baltimore, Maryland, have invented a certain new and useful Process for Making Ester Condensation Products, of which the following is a specification.

My invention relates to making condensation products from esters of the aliphatic series but has relation specially to the production of ethyl acetoacetate.

The object of my invention is to provide a process by means of which such condensation products and particularly ethyl acetoacetate may be obtained in an advantageous manner inasmuch as by my process large yields of the same are obtainable owing to the fact that the by-products formed therein may be very readily separated out.

I have discovered that in the production of such ester condensation products the presence of even a small percentage of the alcohol formed by the action of a metal such as metallic sodium upon an ester, has the effect of stopping the reaction and inhibiting the formation of any further quantity of the condensation product. I have, therefore, provided a process for the production of these products in which the alcohol formed may be continually removed, thereby enabling the reaction to proceed and permitting large yields of the product to be obtained. Further objects of my invention will appear from the detailed description contained hereinafter.

While my invention is capable of being carried out in many different ways, to illustrate the same, I will describe only certain modes of procedure in accordance therewith, hereinafter.

In carrying out my invention, I may use a still of the usual type. I introduce into the still twenty-five to thirty parts by weight of acetic ether which contains approximately 99% by weight of ethyl acetate and 1% by weight of alcohol. To this I add one part by weight of metallic sodium which may, if desired, be substituted by metallic potassium or metallic magnesium. The sodium reacts with the constituents to form with two molecules of the ethyl acetate the sodium compound, $CH_3CONaCHCOOC_2H_5$, accompanied by the formation of alcohol and so as to form with the alcohol present sodium alcoholate with the evolution of hydrogen. The sodium alcoholate also reacts with the ethyl acetate to form the same compound as in the case of the action of sodium thereon. During the action of the sodium upon the contents of the still heat is evolved. The temperature is now maintained at boiling so as to continually distill off a constant boiling mixture of ethyl acetate and alcohol comprising approximately 70% by weight of ethyl acetate and 30% by weight of alcohol. These are recovered in the condenser forming a part of the distilling apparatus above referred to. In this way all of the alcohol is thus removed together with approximately one-half of the ethyl acetate added. The amount of the ethyl acetate added is sufficient not only to react with all of the sodium present but to provide the amount required to form the constant boiling mixture of ethyl acetate and alcohol. It will be understood that the alcohol may be removed at the time when the sodium is being dissolved in the liquid or afterwards.

Thereupon, I introduce into the liquid an amount of carbon dioxide gas equal to slightly more than the theoretical amount thereof required to combine with all of the sodium present, obtaining sodium carbonate and ethyl acetoacetate, which has the formula $CH_3COCH_2COOC_2H_5$. An amount of carbon dioxide gas having twice the weight of the amount of the sodium introduced will be sufficient. The ethyl acetoacetate may then be removed by distillation.

By the use of a gas in this manner the process may be carried out with greater ease of handling, and when using carbon dioxide a valuable by-product is obtained in the form of sodium carbonate. For this purpose, instead other anhydrides may be used, if desired, as for example, sulfur dioxide, sulfur trioxide or acetic anhydride.

The above example has been described in connection with the treatment of ethyl acetate but it is to be understood that any other esters may be treated in this way to produce the corresponding condensation products, as for example, propyl acetate, ethyl propionate, ethyl butyrate, propyl propionate or propyl butyrate.

It is to be understood that many changes may be made in my invention without departing from the spirit of the same.

I claim:

1. A process which comprises reacting upon an ester with a metal to form a compound of the metal therewith and an alcohol, and maintaining the reacting temperature near the boiling point.

2. A process which comprises reacting upon an ester with a metal to form a compound of the metal therewith and an alcohol and continually removing substantially all of the alcohol so as to enable the reaction to continue.

3. A process which comprises reacting upon an ester containing a small proportion of alcohol with an alkali metal to form a compound with the metal therewith and an alcohol, and continually removing the latter.

4. A process which comprises reacting upon an ester with a metal to form a compound of the metal therewith and an alcohol and continually removing substantailly all of the alcohol mixed with a quantity of the ester forming a constant boiling mixture therewith so as to enable the reaction to continue.

5. A process which comprises reacting upon an ester with a metal to form a compound of the metal therewith and an alcohol, removing a quantity of the alcohol during the reaction so as to enable the reaction to continue and then adding a gas to combine with the metallic base and liberate the ester condensation product.

6. A process which comprises reacting upon an ester with a metal to form a compound of the metal therewith and an alcohol, continually removing substantially all of the alcohol so as to enable the reaction to continue and then adding a gas to combine with the metallic base and liberate the ester condensation product.

7. A process which comprises reacting upon an ester with a metal to form a compound of the metal therewith and an alcohol, removing a quantity of the alcohol during the reaction mixed with a quantity of the ester forming a constant boiling mixture therewith so as to enable the reaction to continue and then adding a gas to combine with the metallic base and liberate the ester condensation product.

8. A process which comprises reacting upon an ester with a metal to form a compound of the metal therewith and an alcohol, continually removing substantially all of the alcohol mixed with a quantity of the ester forming a constant boiling mixture therewith, so as to enable the reaction to continue, and then adding a gas to combine with the metallic base and liberate the ester condensation product.

9. A process which comprises reacting upon an ester with a metal to form a compound of the metal therewith and an alcohol, removing a quantity of the alcohol during the reaction so as to enable the reaction to continue, then adding a gas to combine with the metallic base and liberate the ester condensation product and separating the condensation product from the other constituents.

10. A process which comprises reacting upon an ester with a metal to form a compound of the metal therewith and an alcohol, continually removing substantially all of the alcohol so as to enable the reaction to continue, then adding a gas to combine with the metallic base and liberate the ester condensation product and separating the condensation product from the other constituents.

11. A process which comprises reacting upon an ester with a metal to form a compound of the metal therewith and an alcohol, removing a quantity of the alcohol during the reaction mixed with a quantity of the ester forming a constant boiling mixture therewith, so as to enable the reaction to continue, then adding a gas to combine with the metallic base and liberate the ester condensation product and separating the condensation product from the other constituents.

12. A process which comprises reacting upon an ester with a metal to form a compound of the metal therewith and an alcohol, continually removing substantially all of the alcohol mixed with a quantity of the ester forming a constant boiling mixture therewith, so as to enable the reaction to continue, then adding a gas to combine with the metallic base and liberate the ester condensation product and separating the condensation product from the other constituents.

13. A process which comprises reacting upon an ester with a metal to form a compound of the metal therewith and an alcohol, removing a quantity of the alcohol during the reaction so as to enable the reaction to continue and then adding carbon dioxide to combine with the metallic base and liberate the ester condensation product.

14. A process which comprises reacting upon an ester with a metal to form a compound of the metal therewith and an alcohol, continually removing substantially all of the alcohol so as to enable the reaction to continue and then adding carbon dioxide to combine with the metallic base and liberate the ester condensation product.

15. A process which comprises reacting upon an ester with a metal to form a compound of the metal therewith and an alcohol, removing a quantity of the alcohol during the reaction mixed with a quantity of the ester forming a constant boiling mixture therewith, so as to enable the reaction to continue, and then adding carbon dioxide to combine with the metallic base and liberate the ester condensation product.

16. A process which comprises reacting upon an ester with a metal to form a compound of the metal therewith and an alcohol, continually removing substantially all of the alcohol mixed with a quantity of the ester forming a constant boiling mixture therewith, so as to enable the reaction to continue, and then adding carbon dioxide to combine with the metallic base and liberate the ester condensation product.

17. A process which comprises reacting upon ethyl acetate with an alkali metal to form a compound of the metal therewith and an alcohol, and continually removing the latter so as to enable the reaction to continue.

18. A process which comprises reacting upon ethyl acetate with a metal to form a compound of the metal therewith and an alcohol and continually removing substantially all of the alcohol so as to enable the reaction to continue.

19. A process which comprises reacting upon ethyl acetate with sodium to form ethyl aceto acetate and alcohol, and maintaining the temperature near the boiling point to remove the alcohol.

20. A process which comprises reacting upon ethyl acetate with a metal to form a compound of the metal therewith and an alcohol and continually removing substantially all of the alcohol mixed with a quantity of the ester forming a constant boiling mixture therewith so as to enable the reaction to continue.

21. A process which comprises reacting upon ethyl acetate with sodium to form a compound of the metal therewith and an alcohol and continually removing substantially all of the alcohol so as to enable the reaction to continue.

22. A process which comprises reacting upon ethyl acetate with sodium to form a compound of the metal therewith and an alcohol and continually removing substantially all of the alcohol mixed with a quantity of the ester forming a constant boiling mixture therewith so as to enable the reaction to continue.

23. A process which comprises reacting upon an ester with a metal to form a compound of the metal therewith and an alcohol distilling off the alcohol during the reaction, then adding a gas to the liquid to combine with the metallic base and liberate the ester condensation product, and distilling off the condensation product.

24. A process which comprises reacting upon an ester with a metal to form a compound of the metal therewith and an alcohol distilling off the alcohol during the reaction, then adding carbon dioxide to the liquid to combine with the metallic base and liberate the ester condensation product, and distilling off the condensation product.

25. A process which comprises reacting upon an ester with a metal to form a compound of the metal therewith and an alcohol, and removing a quantity of the alcohol during the reaction so as to enable the reaction to continue.

In testimony that I claim the foregoing, I have hereunto set my hand this 26th day of January, 1921.

RAY M. CARTER.